Patented Nov. 25, 1930

1,782,723

UNITED STATES PATENT OFFICE

HARRY C. HETHERINGTON, OF WASHINGTON, DISTRICT OF COLUMBIA, AND HERBERT J. KRASE, OF CLARENDON, VIRGINIA, ASSIGNORS TO ARTHUR B. LAMB, TRUSTEE

MANUFACTURE OF UREA

No Drawing. Application filed March 2, 1926. Serial No. 91,831.

This invention relates to the manufacture of urea from ammonia and carbon dioxide, and in particular to the provision by which the manufacture may be economically carried out in a continuous manner.

It is well known that when ammonia and carbon dioxide are heated in an autoclave to a temperature above 140° C., a part of the charge, usually 40–50% is converted to urea. Previous methods for the continuous production of urea have provided for (a) the subsequent utilization of the unconverted ammonia by first distilling it from the charge and then neutralizing it with an acid, e. g., sulphuric, phosphoric, etc., (French Patent No. 527,733 of 1921); (b) the recovery and return to the urea forming system of the unconverted mixed gases ($2NH_3 + CO_2$) by means of stills, compressors and conveying lines all maintained at an elevated temperature to avoid the separation of liquid or solid ammonium salts, (U. S. Patent No. 1,429,483 of 1922); (c) the recovery of the mixed gases by means of absorption in an aqueous solution and subsequent expulsion of the gases by means of heat, which serves to bring the gases to the pressure required for the urea-forming reaction, (U. S. Patent No. 1,453,069 of 1923.) Such methods are open to several objections, viz., (a) the utilization of the recovered ammonia in the production of ammonium salts is only applicable where it is economically or otherwise desirable to manufacture these salts in conjunction with urea, (b) it is well known that moist mixtures of $NH_3$ and $CO_2$ are highly corrosive to most metals, particularly at the elevated temperatures necessary to avoid deposition of salts of ammonia. In view of such facts, the difficulties in the way of compressing the mixed gases are, if not mechanically insurmountable, at least sufficient to render the construction and operation of the apparatus (pumps, etc.) not economically desirable. In addition, there remains the difficulty of reducing the moisture content of the mixed gases to the point most desirable in the synthesis of urea. Furthermore, the introduction of water into the urea-forming autoclave results in lowered yields of urea, as is well known to those skilled in the art.

Now we have discovered a process by which urea may be advantageously produced without the chemical disadvantage resulting from introduction of water into the urea-forming autoclave. This process may also be performed without the mechanical disadvantages inherent in compressing corrosive gas mixtures.

This process involves separating from each other the unconverted $NH_3$ and $CO_2$, after removal of these gases from the sludge discharged from the urea-forming autoclave. The removal of the unconverted gases from the urea-containing sludge is effected by any of the well-known methods in which, for example, the product from the urea-forming autoclave is discharged into a still maintained at the proper temperature and under approximately atmospheric pressure, in which still all or part of the unconverted ammonia and carbon dioxide, together with some water, are discharged as gases. The urea, partly or wholly in solution, is drawn from the still and recovered in any well-known manner. The ammonia and carbon dioxide leaving the still may be treated in accordance with our accompanying application entitled "Separation of gases", Serial No. 91,833, or by any of the other methods for separating ammonia and carbon dioxide known to the art.

The method outlined in our copending application Serial No. 91,833, is probably to be preferred, such method consisting in scrubbing the gases with an aqueous solution of an ammonium salt, other than a carbonic acid salt. The solution should preferably contain at least 10% by weight of the ammonium salt. The solution is heated to 80° to 100° C. to expel the carbon dioxide and the temperature then further raised to expel the ammonia gas.

The cycle of operations for continuously producing urea from $NH_3$ and $CO_2$ by means of our invention may be substantially as follows: The two gases $NH_3$ and $CO_2$ are separately and continuously delivered by means of compressors to a urea-forming system, which may consist of coolers, condensers and one or more autoclaves maintained at suitable temperatures and pressures for the synthesis of urea. From the urea-forming system is withdrawn the product consisting of urea and water and the unconverted portions of the ammonia and carbon dioxide.

During the withdrawal of the product from the urea autoclave, the pressure to which the discharged mixture is subjected is decreased from that existing in the urea autoclave to approximately one atmosphere. During this operation much of the unconverted ammonia and carbon dioxide, together with some water, leaves the solution. The remainder may be expelled from the urea solution by heating the latter.

The gases expelled from the still consisting of ammonia, carbon dioxide and some water are then treated by any of the known methods for separating ammonia from carbon dioxide.

The ammonia and carbon dioxide may then be separately returned to the urea synthesis system or they may be treated separately for the removal of moisture and then returned to the urea synthesis system together with additional ammonia and carbon dioxide to replace that converted to urea.

We claim:

1. The method of continuously producing urea by heating ammonia and carbon dioxide under pressure, including separating from each other the ammonia and carbon dioxide unconverted to urea, and returning them separately to the urea-forming system.

2. The method of continuously producing urea by heating ammonia and carbon dioxide under pressure, including separating from each other the ammonia and carbon dioxide unconverted to urea, drying the separated gases and returning them separately to the urea-forming system.

3. The method of producing urea including, introducing ammonia and carbon dioxide to an area maintained at a urea-forming temperature and pressure, discharging the resulting solution from said area, separating the uncombined ammonia and carbon dioxide, drying the separated gases, and then returning them separately to the aforesaid area together with additional ammonia and carbon dioxide, to replace that converted to urea.

HARRY C. HETHERINGTON.
HERBERT J. KRASE.